(12) United States Patent
Su et al.

(10) Patent No.: US 8,708,754 B2
(45) Date of Patent: Apr. 29, 2014

(54) RJ CONNECTOR TRANSMITTING ELECTRICAL AND OPTICAL SIGNALS

(75) Inventors: Ping-Sheng Su, New Taipei (TW); Jun Chen, Kunshan (CN); Qing Wang, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 53 days.

(21) Appl. No.: 13/349,920

(22) Filed: Jan. 13, 2012

(65) Prior Publication Data
US 2012/0196488 A1 Aug. 2, 2012

(30) Foreign Application Priority Data
Jan. 28, 2011 (CN) .......................... 2011 2 0030256

(51) Int. Cl.
*H01R 24/00* (2011.01)

(52) U.S. Cl.
USPC .............................. 439/676; 385/75; 439/660

(58) Field of Classification Search
USPC ........ 439/660, 676, 638; 385/55, 75–98, 139, 385/851; 398/116–117
See application file for complete search history.

(56) References Cited

U.S. PATENT DOCUMENTS

| 4,516,822 | A | 5/1985 | Wolfel | |
|---|---|---|---|---|
| 6,017,237 | A * | 1/2000 | Sullivan | 439/392 |
| 6,932,641 | B1 * | 8/2005 | Liao | 439/460 |
| 2011/0115494 | A1 * | 5/2011 | Taylor et al. | 439/660 |
| 2011/0243505 | A1 * | 10/2011 | Su et al. | 385/75 |

* cited by examiner

*Primary Examiner* — Briggitte R Hammond
(74) *Attorney, Agent, or Firm* — Wei Te Chung; Ming Chieh Chang

(57) ABSTRACT

A RJ plug connector includes a plug body with a base section and a plurality of conductive contacts received in the base section. The base section defines a front mating face and a rear cavity. A latch with a lead-in is form on the top face to locking with a socket connector. The RJ connector further defines an optical fiber module which is incorporated with the latch adjacent to the lead-in and has a coupling interface at a front face of the latch. It not only can insure large capacity and high rate data transmission, but also can extend data transmission distance without loss.

9 Claims, 4 Drawing Sheets

RJ CONNECTOR TRANSMITTING ELECTRICAL AND OPTICAL SIGNALS

BACKGROUND OF THE INVENTION

1. Field of the Invention

The present invention relates to a RJ connector, and more particularly to a RJ connector incorporated with optical couplers in which optical signals can be transmitted to and from.

2. Description of Related Art

Nowadays, RJ connectors have been widely used for transmitting data, specially within interne and intranet. However, because the data rate become faster and faster, and the volume transmitted become larger and larger, the existing bandwidth of existing RJ connector is not enough. As such, optical fiber has been introduced in different sectors. As a result, how to incorporate a pair of optical fiber into an existing RJ connector which not altering its existing interface, is really a challenge of the industry.

Hence, a RJ connector used for transmitting both electrical and optical signals is desired to overcome the above problems.

BRIEF SUMMARY OF THE INVENTION

Accordingly, an object of the present invention is to provide a RJ connector incorporated with an optical unit for transmitting optical signals.

To achieve the above object, a RJ connector made in accordance with the present invention includes a plug body with a base section and a plurality of conductive contacts received in the base section. The base section defines a front mating face and a rear cavity. A latch with a lead-in is formed on the top face to interlocking with a mating RJ socket connector. The RJ connector further defines an optical fiber module which is incorporated with the latch adjacent to the lead-in and has a coupling interface at a front face of the latch.

Other objects, advantages and novel features of the invention will become more apparent from the following detailed description when taken in conjunction with the accompanying drawings.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

In the following description, numerous specific details are set forth to provide a thorough understanding of the present invention. However, it will be obvious to those skilled in the art that the present invention may be practiced without such specific details.

Figure 1:
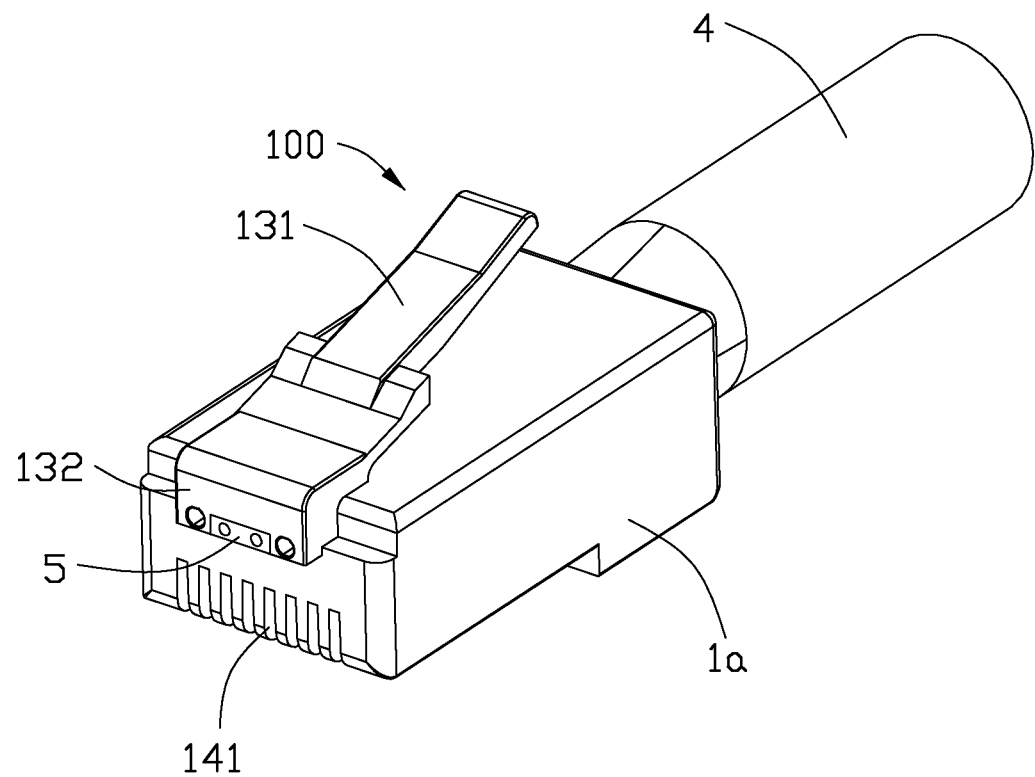
FIG. 1 is a perspective view of a RJ connector according to an embodiment of the present invention.

Referring to FIG. 1, a RJ connector 100 made in accordance with an optical module 5 to increase data transfer through optical transmission is illustrated. The RJ connector 100 is designed for transmission electrical signal and has a latch 131 which is intended to interlock with a recess defined in a modular jack, such as RJ 45, RJ 11 which is widely known to skilled in this field, and not detailed description is given. According to an embodiment of the present invention, said optical fiber module 5 is disposed and integrated in the latch 131. Alternatively, the optical module can be arranged at other proper positions of the RJ connector according to field requirement. The RJ connector made according to the present invention can be operated with the following mode, 1) pure electrical; 2) pure optical; and 3) hybrid, i.e. signals transmitted both through optical and electrical. The RJ connector includes a plug body 1a with a base section 1, a plurality of contacts 2 and the optical module 5, and a cable 4 connecting with the plug body 1a.

Figure 2:
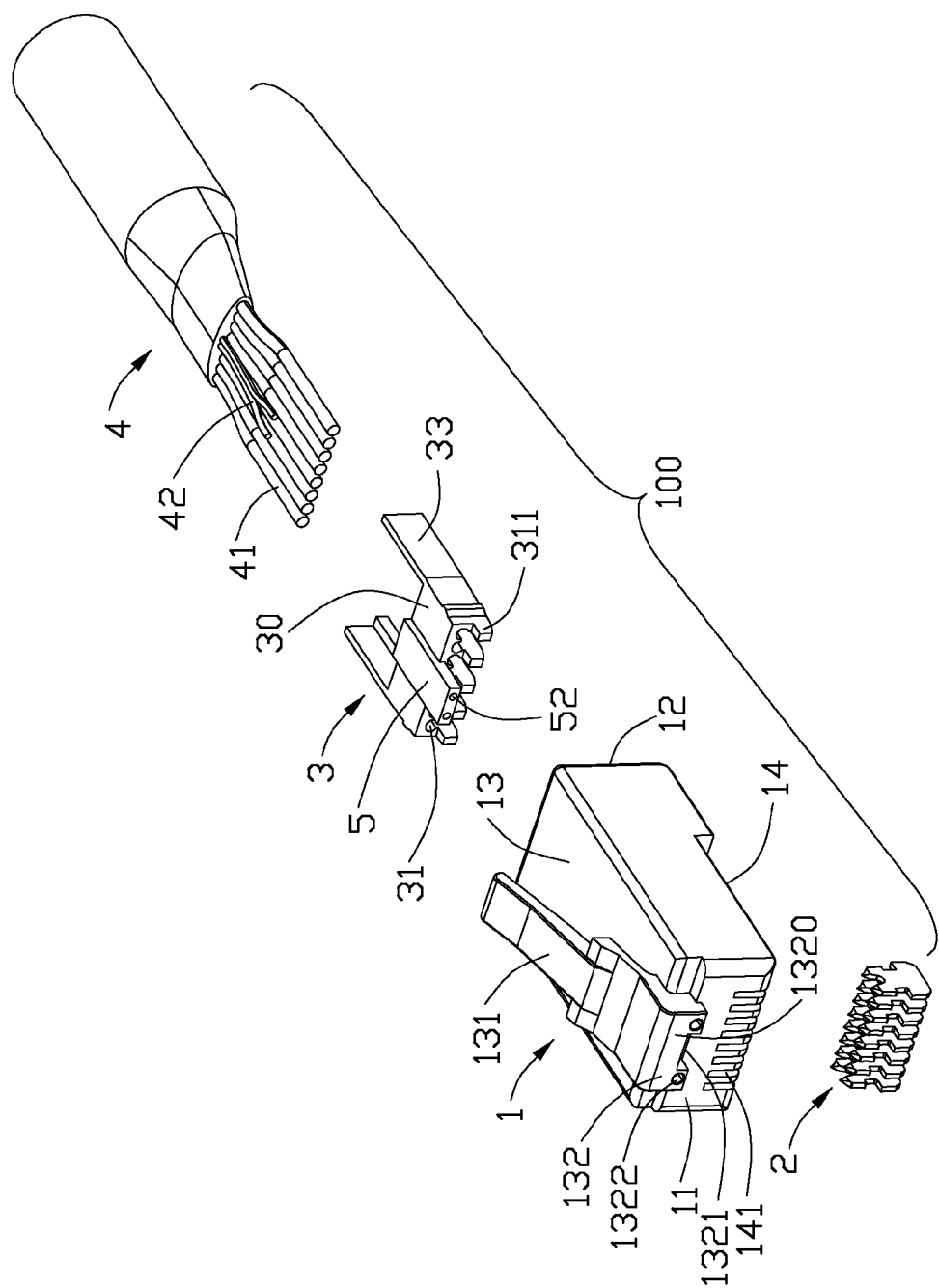
FIG. 2 is an exploded perspective view of the RJ connector shown in FIG. 1.
Figure 3:
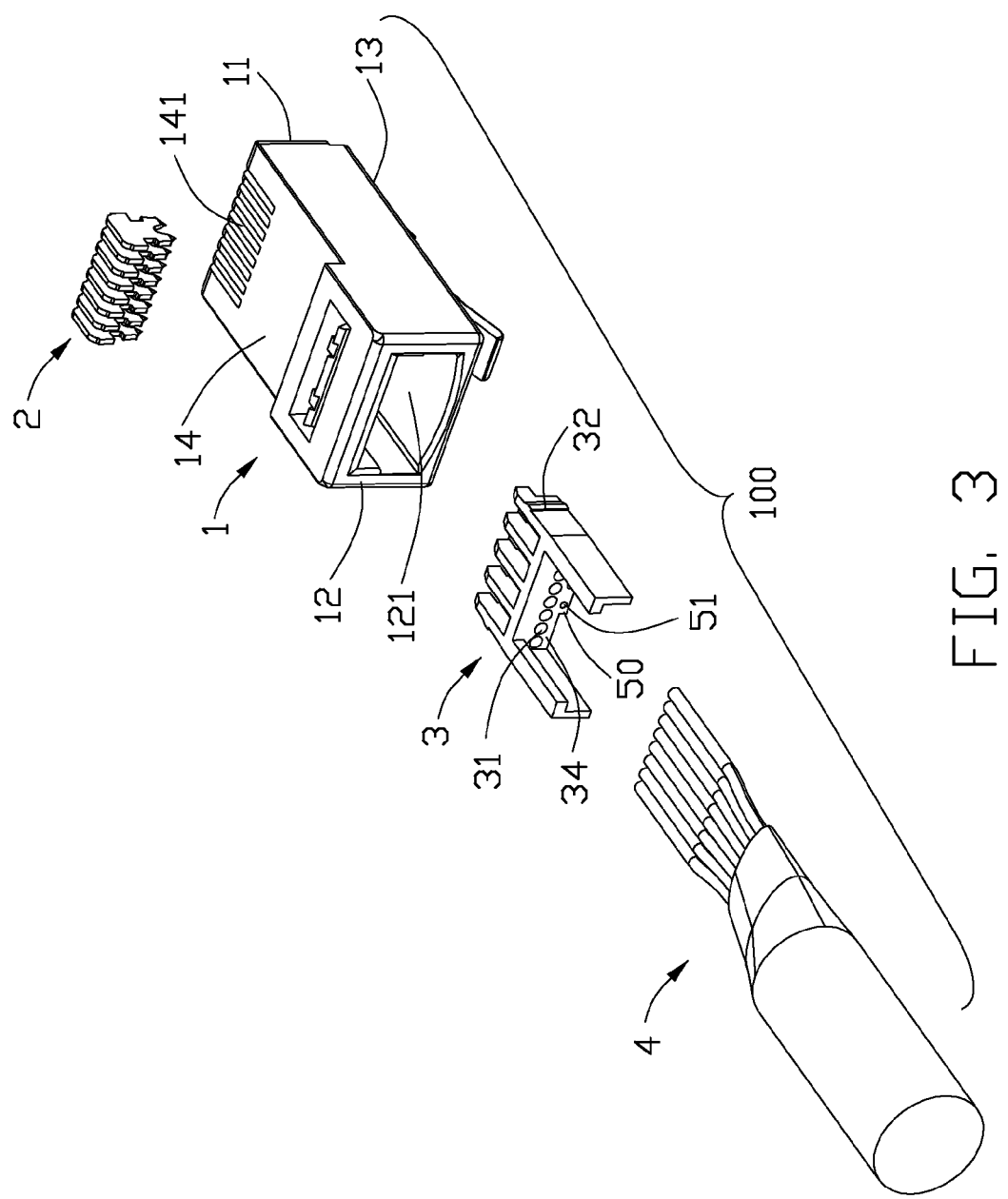
FIG. 3 is similar to FIG. 2, but viewed from another aspect.

Referring to FIGS. 2-3, said the base section 1 defines a front face 11 and a rear face 12, a top face 13 and a bottom face 14. The front face 11 functioning as a mating face is designed for interconnecting with a RJ socket (not shown). A receiving cavity 121 is provided and runs through the rear face 12 of the base section 1. The latch 131 with a lead-in is formed on the top face 13 for interlocking with the RJ socket when it is received therein and which defines a protrusion section 132 protruding from the front face 11, said the protrusion section 132 is disposed for enlarging a root of the latch 131 to base section 1. Opposite to the latch 131, the base section 1 defines a plurality of passageways 141 running through the front face and the bottom face 14 to receive the conductive contacts 2.

The protrusion section 132 defines a receiving groove 1321 running through a front face 1320 thereof and two positioning holes 1322 at opposite ends of the receiving groove 1321, which are constructed for accommodating an inserted module 3 loaded with said optical module 5.

The inserted module 3 is sized to be snugly inserted into the receiving cavity 121 and defines a plurality of first through hole 31 running through a front and rear faces thereof. The optical module 5 with two lenses 52 at a front face thereof and two second through holes 51 extend through a rear face 50 thereof is located at a top face 30 of the inserted module 3. A pair of arms 33 extends rearwards from two opposite ends of the rear face 34 of the inserted module 3.

Figure 4:
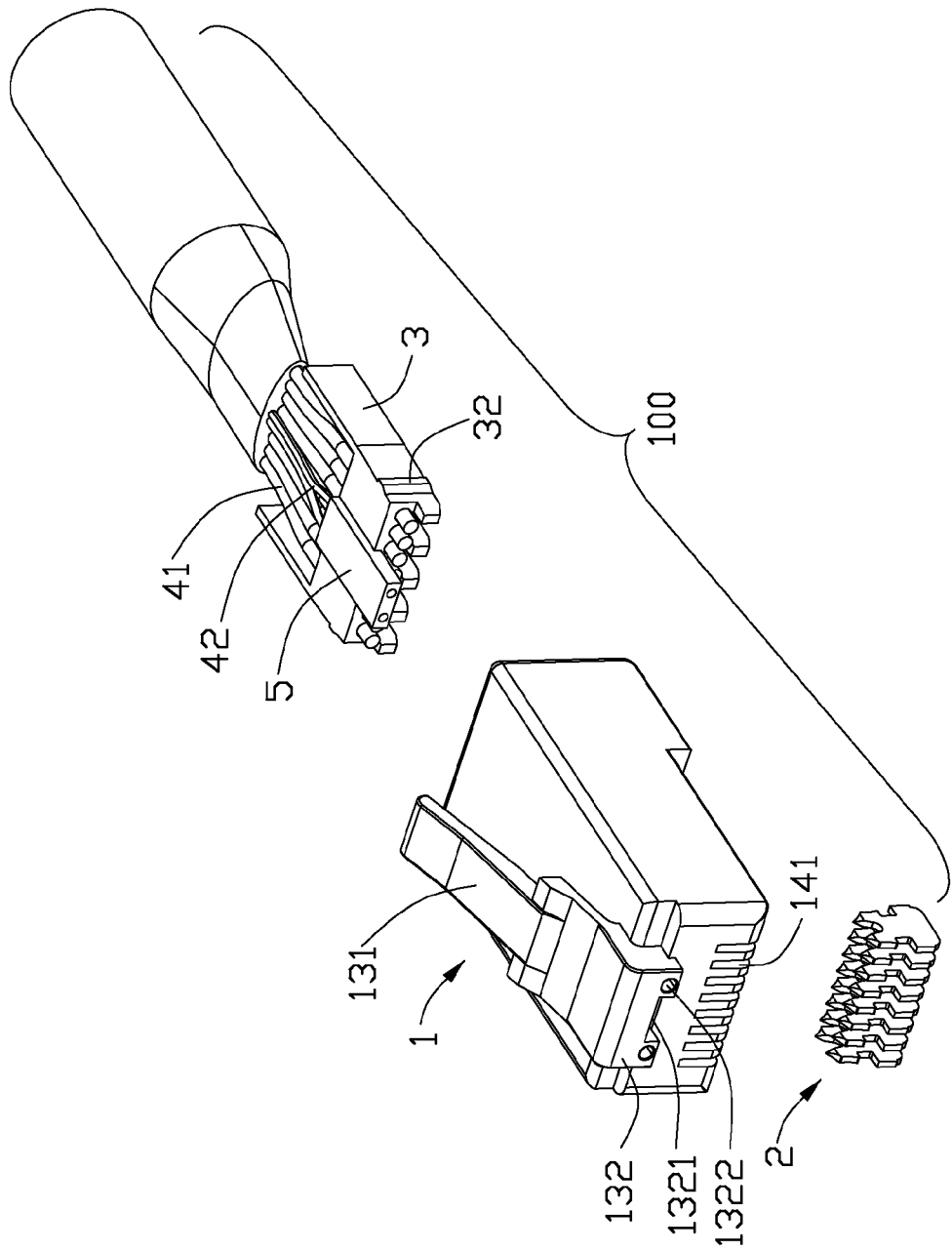
FIG. 4 is an partly exploded perspective view of the RJ connector.

The cable 4 include a plurality of electric core wires 41 and two optical fibers 42, which are inserted in the first and second receiving holes 31,51 so that the cables 4 are located in the inserted module 3 as shown in FIG. 4 and then the inserted module 3 is inserted in the receiving cavity 121, thereby electric core wires 41 connecting with the conductive contact 2 and the optical fibers 42 being aligned with and coupling with the lenses 52. A plurality of separating ribs 311 are disposed between every two first through holes 31 to assist supporting electric core wires 41 and two vertical interference ribs 32 is defined at two opposite side of the inserted module 3, which will achieve a good retention between the inserting section and base section.

An assembling of RJ connector assembly 100 is described as followed. Firstly, the electric core wires 41 and optical fibers 42 are inserted in receiving holes 31, 51 of the inserted module 3 respectively, said the optical fibers 42 are coupling with the optical lenses 52 for transmitting optical signals. Secondly, the inserted module 3 is inserted in the receiving cavity 121 and then the optical module 5 is assembled to the receiving groove 1321 of the protrusion section 132, said the receiving groove 1321 also can be arranged on any other places of the base section 1. Finally, the conductive contacts 2 are received in passageways 141 of the base section and the contacts 2 are connecting with the electric core wires 41 for transmitting electric signals.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A RJ connector comprising:
a plug body defining a front face and a latch at a top face thereof which is adapted for latch with a counter connector mating with the RJ connector;
a plurality of conductive contacts loaded in the plug body and opening to an exterior through the front face and a bottom face;
a cable comprising optical fibers coupling with the lenses of the optical module and a plurality of electric core wires connecting with the conductive contacts;
wherein the latch defines a protrusion section protruding from the front face of the plug body, the protrusion section defines a receiving groove running through a front face thereof, an optical module is inserted in the receiving groove and the optical module defines lenses exposed to the front face of the plug body so as to provide an optical I/O interface.

2. The RJ connector according to claim 1, wherein the plug body defines a rear cavity and an inserted module is received in the cavity, said optical module is located on the inserted module and said cables are supported in the inserted module.

3. The RJ connector according to claim 2, wherein the inserted module defines a plurality of first through hole running through a front and rear faces thereof to receive said electric core wires and the optical module defines two second through holes through a rear face thereof to receive said optical fibers.

4. The RJ connector according to claim 3, wherein two vertical interference ribs are defined at two opposite sides of the inserted module.

5. The RJ connector according to claim 3, wherein a plurality of separating ribs are disposed between every two first through holes to assist supporting said electric core wires.

6. A RJ connector comprising:
a plug body defining a mating face, a receiving cavity and a protrusion section protruding from the mating face, the protrusion section defining a receiving groove opening to the mating face;
a plurality of conductive contacts loaded in the plug body and opening to the mating face;
an inserting module received in the receiving cavity, the inserted module being disposed thereon with an optical module;
wherein the optical module protrudes in the receiving groove and defines lenses exposing to the mating face.

7. An RJ plug connector comprising:
an insulative body defining a mating configuration for use with a modular jack, and having a latch rooted on a first face and deflectable in a vertical direction, and a plurality of blade type contacts on a second face of the housing opposite to said first face in said vertical direction for coupling to corresponding terminals of a complementary connector in said vertical direction;
a receiving groove formed in the housing around the first face between the latch and the blade type contacts in said vertical direction and extending along a front-to-back direction perpendicular to said vertical direction;
an inserted module having a plurality of lenses and forwardly inserted into the receiving groove in the front-to-back direction to forwardly communicate with corresponding optical members of the complementary connector in the front-to-back direction; and
a cable including a plurality of conductive wires and a plurality of optical fibers connected to the corresponding contacts and lenses, respectively.

8. The RJ plug connector as claimed in claim 7, wherein both said wires and said optical fibers are regulated in said inserted module.

9. The RJ plug connector as claimed in claim 7, wherein said body defines a protrusion on a front face, and said inserted module extends forwardly through said protrusion.

* * * * *